(12) United States Patent
Ha

(10) Patent No.: US 11,911,906 B2
(45) Date of Patent: Feb. 27, 2024

(54) METHOD, SYSTEM, AND NON-TRANSITORY COMPUTER-READABLE RECORDING MEDIUM FOR CONTROLLING A PATROLLING ROBOT

(71) Applicant: Bear Robotics, Inc., Redwood City, CA (US)

(72) Inventor: John Jungwoo Ha, Frisco, TX (US)

(73) Assignee: Bear Robotics, Inc., Redwood City, CA (US)

( * ) Notice: Subject to any disclaimer, the term of this patent is extended or adjusted under 35 U.S.C. 154(b) by 292 days.

(21) Appl. No.: 17/326,467

(22) Filed: May 21, 2021

(65) Prior Publication Data

US 2022/0371198 A1 Nov. 24, 2022

(51) Int. Cl.
*G05D 1/00* (2006.01)
*G05D 1/02* (2020.01)
*B25J 9/16* (2006.01)

(52) U.S. Cl.
CPC .......... *B25J 9/1661* (2013.01); *G05D 1/0088* (2013.01); *G05D 1/021* (2013.01); *G05D 1/0212* (2013.01); *B25J 9/1653* (2013.01); *B25J 9/1664* (2013.01); *B25J 9/1679* (2013.01); *G05B 2219/40411* (2013.01); *G05B 2219/45084* (2013.01)

(58) Field of Classification Search
CPC ...... B25J 9/1664; B25J 9/1653; B25J 9/1661; B25J 9/1679; B25J 9/1697; B25J 13/006; B25J 5/007; B25J 11/0045; B25J 11/008; G05B 2219/40411; G05B 2219/45084; G05D 1/0212; G05D 2201/0211; G05D 1/0231; G05D 1/0255; G05D 1/0257; G05D 1/0088; G05D 1/021

See application file for complete search history.

(56) References Cited

U.S. PATENT DOCUMENTS

| | | | |
|---|---|---|---|
| 2015/0046018 A1* | 2/2015 | Hayashi | G05D 1/0088 901/1 |
| 2017/0364074 A1* | 12/2017 | Lau | G06Q 10/08355 |
| 2018/0246513 A1* | 8/2018 | Cronin | G07F 11/46 |
| 2018/0319607 A1* | 11/2018 | Nemati | B65G 1/1376 |
| 2020/0009731 A1 | 1/2020 | Chae et al. | |
| 2021/0039255 A1* | 2/2021 | Lee | B25J 9/1697 |
| 2021/0102817 A1 | 4/2021 | Kim et al. | |
| 2021/0174370 A1* | 6/2021 | Yim | B25J 11/0045 |

(Continued)

FOREIGN PATENT DOCUMENTS

| | | |
|---|---|---|
| JP | 2014085829 A | 5/2014 |
| KR | 101083700 B1 | 11/2011 |

(Continued)

*Primary Examiner* — Abby Y Lin
*Assistant Examiner* — Karston G. Evans
(74) *Attorney, Agent, or Firm* — Dinsmore & Shohl LLP; Yongsok Choi, Esq.

(57) ABSTRACT

A method for controlling a patrolling robot is provided. The method includes the steps of: acquiring, as first situation information on the patrolling robot, at least one of weight information on a support coupled to the patrolling robot and image information on the support and information on a location of the patrolling robot in a patrolling place; and determining a task and a travel route of the patrolling robot on the basis of the first situation information.

13 Claims, 6 Drawing Sheets

(56) References Cited

U.S. PATENT DOCUMENTS

| | | | |
|---|---|---|---|
| 2021/0200239 A1* | 7/2021 | Chae | G05D 1/0287 |
| 2022/0206506 A1* | 6/2022 | Taira | G05D 1/0223 |
| 2022/0260992 A1* | 8/2022 | Oda | H04W 4/46 |

FOREIGN PATENT DOCUMENTS

| | | |
|---|---|---|
| KR | 1020190098108 A | 8/2019 |
| KR | 1020200110143 A | 9/2020 |
| KR | 1020210033214 A | 3/2021 |
| WO | 2019151387 A1 | 8/2019 |

\* cited by examiner

300

METHOD, SYSTEM, AND NON-TRANSITORY COMPUTER-READABLE RECORDING MEDIUM FOR CONTROLLING A PATROLLING ROBOT

FIELD OF THE INVENTION

The present invention relates to a method, system, and non-transitory computer-readable recording medium for controlling a patrolling robot.

BACKGROUND

Serving means providing objects including drinks or food to customers in a place such as a restaurant. In recent years, robots and the like have been developed and used for serving in place of, or rendering assistance to, waiters or waitresses. Such a robot usually functions to take food orders or carry out serving according to the orders, and may perform autonomous navigation using table position information or the like. The robot may comprise a transport means (including sensors for avoiding obstacles), a display means for menu output or order input, and the like. Further, the robot may include a means for placing or carrying food or food containers.

As an example of related conventional techniques, Korean Registered Patent Publication No. 10-1083700 discloses a restaurant serving robot system for taking orders in a restaurant and transporting a tray where ordered food is placed, the system comprising: an upper part including a pair of articulated robot arms which are synchronously driven, and a tray holding part rotatably coupled to a lower end of the articulated robot arms and configured to fix the tray; a lower part at a bottom part of which a robot moving part including a main wheel and one or more auxiliary wheels is provided; a middle part fixed to the lower part and rotatably connected to the upper part; and a control part configured to control the operations of the pair of articulated robot arms, the tray holding part, and the robot moving part, wherein the tray holding part comprises: a hand rotatably coupled to an end of the articulated robot arms; a fixing part provided at the hand to move upward and downward; a gripper positioned at a bottom part of the tray and coupled to the fixing part; a stopper positioned at a top part of the tray and coupled to the fixing part to face the gripper; a switch pressed by the fixing part which moves upward when the stopper is pressed by the tray at the same time the end of the articulated robot arms is driven downward; a spring contracted when the fixing part moves upward; and a gripper angle detection unit configured to detect an angle of the gripper.

Meanwhile, the serving robots introduced so far as well as the above-described conventional serving robot have been basically developed to perform tasks of taking food orders or carrying out serving according to the orders in serving places such as restaurants. These serving robots are not suitable to perform tasks of distributing prepared serving objects (e.g., food or drinks) to attendees or retrieving the distributed serving objects (i.e., bussing) in an event such as a cocktail party or a conference while patrolling around the event venue, rather than serving ordered food.

In this connection, the inventor(s) present a technique for controlling a patrolling robot configured to perform a task of distributing prepared serving objects to attendees or retrieving the distributed serving objects while patrolling around an event venue.

SUMMARY OF THE INVENTION

One object of the present invention is to solve all the above-described problems in the prior art.

Another object of the invention is to acquire, as first situation information on a patrolling robot, at least one of weight information on a support coupled to the patrolling robot and image information on the support and information on a location of the patrolling robot in a patrolling place, and to determine a task and a travel route of the patrolling robot on the basis of the first situation information.

Yet another object of the invention is to determine a task and a travel route of a patrolling robot with reference to demand for serving objects in each space of a patrolling place.

The representative configurations of the invention to achieve the above objects are described below.

According to one aspect of the invention, there is provided a method for controlling a patrolling robot, the method comprising the steps of: acquiring, as first situation information on the patrolling robot, at least one of weight information on a support coupled to the patrolling robot and image information on the support and information on a location of the patrolling robot in a patrolling place; and determining a task and a travel route of the patrolling robot on the basis of the first situation information.

According to another aspect of the invention, there is provided a system for controlling a patrolling robot, the system comprising: a situation information management unit configured to acquire, as first situation information on the patrolling robot, at least one of weight information on a support coupled to the patrolling robot and image information on the support and information on a location of the patrolling robot in a patrolling place; and a task and travel management unit configured to determine a task and a travel route of the patrolling robot on the basis of the first situation information.

In addition, there are further provided other methods and systems to implement the invention, as well as non-transitory computer-readable recording media having stored thereon computer programs for executing the methods.

According to the invention, it is possible to acquire, as first situation information on a patrolling robot, at least one of weight information on a support coupled to the patrolling robot and image information on the support and information on a location of the patrolling robot in a patrolling place, and to determine a task and a travel route of the patrolling robot on the basis of the first situation information.

According to the invention, it is possible to determine a task and a travel route of a patrolling robot with reference to demand for serving objects in each space of a patrolling place.

DETAILED DESCRIPTION OF THE INVENTION

Figure 1:
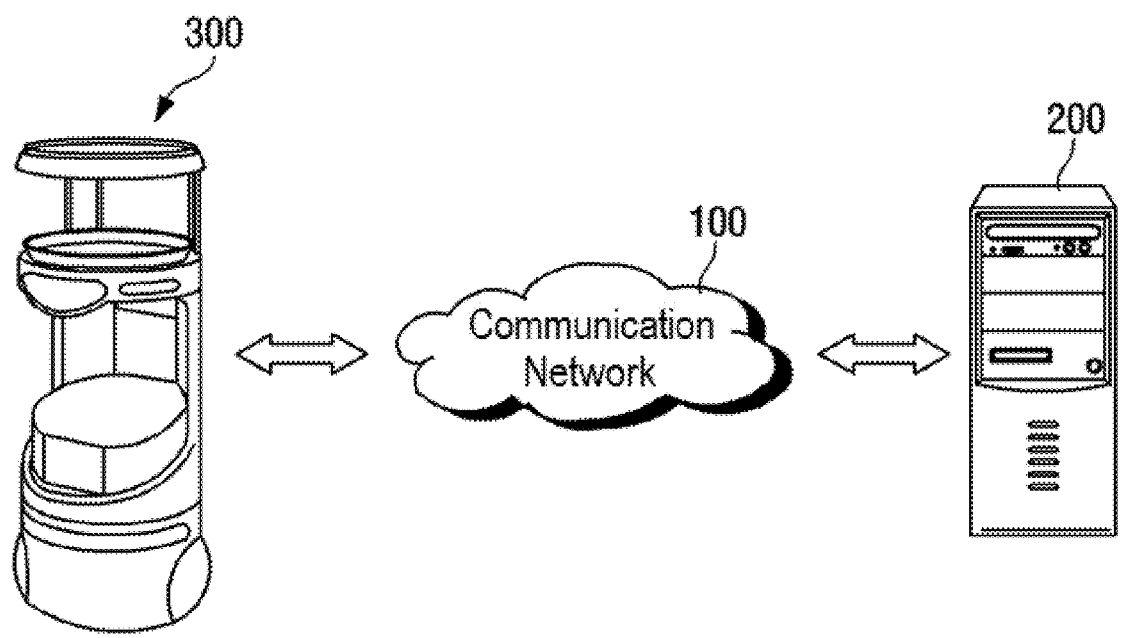
FIG. 1 schematically shows the configuration of an entire system for controlling a patrolling robot according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Configuration of the Entire System

FIG. 1 schematically shows the configuration of the entire system for controlling a patrolling robot according to one embodiment of the invention.

As shown in FIG. 1, the entire system according to one embodiment of the invention may comprise a communication network 100, a robot control system 200, and a patrolling robot 300.

First, the communication network 100 according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television communication networks.

For example, the communication network 100 may be a wireless data communication network, at least a part of which may be implemented with a conventional communication scheme such as WiFi communication, WiFi-Direct communication, Long Term Evolution (LTE) communication, 5G communication, Bluetooth communication (including Bluetooth Low Energy (BLE) communication), infrared communication, and ultrasonic communication. As another example, the communication network 100 may be an optical communication network, at least a part of which may be implemented with a conventional communication scheme such as LiFi (Light Fidelity).

Next, the robot control system 200 according to one embodiment of the invention may function to acquire, as first situation information on a patrolling robot, at least one of weight information on a support coupled to the patrolling robot and image information on the support and information on a location of the patrolling robot in a patrolling place, and to determine a task and a travel route of the patrolling robot on the basis of the first situation information.

The configuration and functions of the robot control system 200 according to the invention will be discussed in more detail below.

Next, the patrolling robot 300 according to one embodiment of the invention is a device capable of communicating with the robot control system 200 via the communication network 100 and performing predetermined functions or assigned tasks (e.g., serving food, retrieving containers, etc.) autonomously without any operation of a user (e.g., an employee or a customer), and may include a support configured to support at least one serving object. The patrolling robot 300 according to one embodiment of the invention may include at least one of a module (e.g., a grab or a robotic arm module) for loading and unloading a serving object (e.g., a food tray), an imaging module (e.g., a visible light camera or an infrared camera) for acquiring images of surroundings, a scanner module (e.g., a LIDAR sensor) for acquiring information on obstacles, a sound acquisition module (e.g., a microphone) for acquiring sounds of surroundings, a display and speaker module for providing images and sounds, and a drive module (e.g., a motor) for moving the patrolling robot 300.

For example, the patrolling robot 300 may have characteristics or functions similar to those of at least one of a guide robot, a serving robot, a transport robot, a cleaning robot, a medical robot, an entertainment robot, a pet robot, and an unmanned flying robot. Meanwhile, supporting of a serving object herein should be interpreted as encompassing supporting of a container for containing a serving object such as a drink or food, a means where the container may be placed (e.g., a tray), or the like.

Meanwhile, according to one embodiment of the invention, the patrolling robot 300 may include an application (not shown) for controlling the patrolling robot 300 according to the invention. The application may be downloaded from the robot control system 200 or an external application distribution server (not shown). According to one embodiment of the invention, the characteristics of the application may be generally similar to those of a situation information management unit 210, a task and travel management unit 220, a communication unit 230, and a control unit 240 of the robot control system 200 to be described below. Here, at least a part of the application may be replaced with a hardware device or a firmware device that may perform a substantially equal or equivalent function, as necessary.

Figure 4:
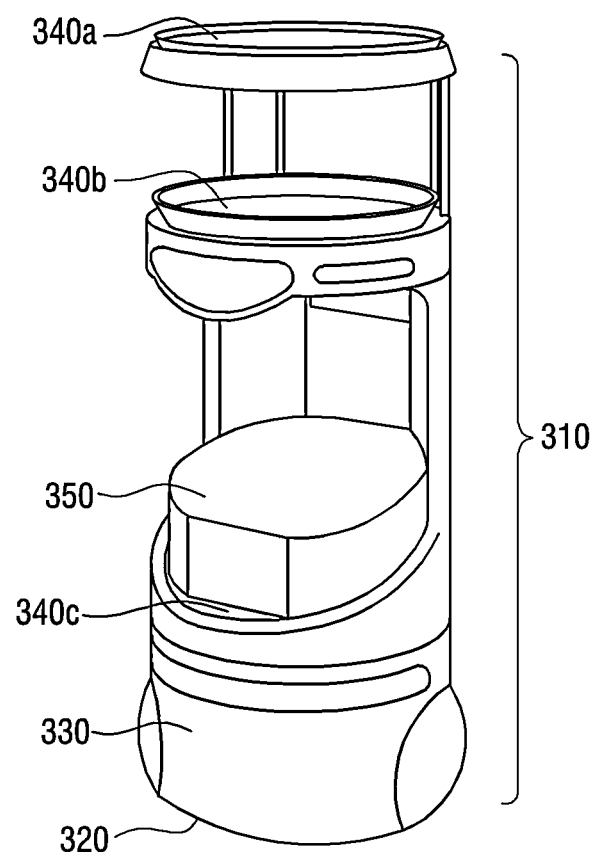
FIG. 4 illustratively shows the structure of a patrolling robot according to one embodiment of the invention.
Figure 5:
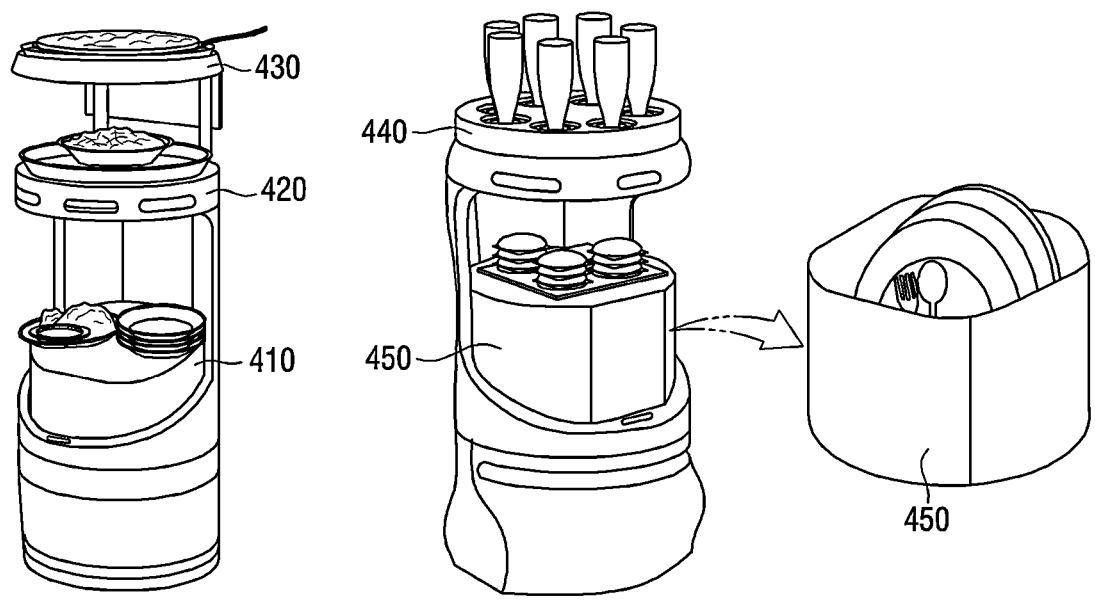
FIG. 5 illustratively shows the structure of a patrolling robot according to one embodiment of the invention.

FIGS. 4 and 5 illustratively show the structure of the patrolling robot 300 according to one embodiment of the invention.

Referring to FIG. 4, the patrolling robot 300 may comprise a main body 310, a drive unit 320, and a processor 330.

First, the main body 310 according to one embodiment of the invention may be coupled to supports 340a, 340b, and 340c configured to support at least one serving object. According to one embodiment of the invention, the supports 340a, 340b, and 340c may be removably coupled for cleaning, replacement, or the like. Further, each of the supports 340a, 340b, and 340c may include a weight sensor (not shown) for sensing a weight supported by each of the supports 340a, 340b, and 340c. According to one embodiment of the invention, the weight sensor may be implemented using one or more strain gauges (e.g., three strain gauges, four strain gauges, or the like). In addition, according to one embodiment of the invention, the weight sensor may be coupled to the processor 330.

Further, the main body 310 according to one embodiment of the invention may include a photographing module (not shown) configured to face a spatial region above each of the supports 340a, 340b, and 340c, in place of or in addition to the weight sensor. Meanwhile, according to one embodiment of the invention, the photographing modules configured to face the spatial regions above the respective supports 340a, 340b, and 340c are not necessarily included in the main body 310, but at least some of the photographing modules may be installed on a structure in a patrolling place.

Meanwhile, the main body 310 according to one embodiment of the invention may include at least one loading space for loading an object to be transported or retrieved. (Herein, an object to be transported or retrieved may be referred to as a serving object.) Further, according to one embodiment of the invention, the at least one loading space may include the supports 340a, 340b, and 340c. The transported or retrieved object according to one embodiment of the invention may refer to all material objects that can be moved, and may encompass things, animals, and people, for example. For example, the transported object may be food and the retrieved object may be a container containing the food.

Referring to FIG. 5, the patrolling robot 300 according to one embodiment of the invention may include a first space 410 and a second space 420 for providing the transported object (i.e., serving) and collecting the retrieved object (i.e., bussing). Further, the patrolling robot 300 may further include a third space 430 that is an expansion space provided via a removable pillar, and more loading spaces may be provided by adding more expansion spaces as needed. Further, the patrolling robot 300 may further include a tray 440 dedicated for the transported or retrieved object. For example, the tray 440 may be configured such that a plurality of circular grooves are formed on its top side as seen from the top. Each of the circular grooves may be formed such that the lower part of a cup containing a drink is seated and easily fixed to some extent. The sizes of the circular grooves may be diverse. Further, the lower part of the first space 410 of the patrolling robot 300 may include a fourth space 450 that may be taken out through a lateral side of the patrolling robot 300. The fourth space 450 according to one embodiment of the invention may have a shape similar to a basket, such that an empty space is formed therein; a lateral side thereof is closed; a top side thereof is open; and a bottom side thereof is closed. However, the loading spaces of the patrolling robot 300 according to the invention are not necessarily limited to the above description, and may be diversely implemented as other types of loading spaces as long as the objects of the invention may be achieved.

Next, referring to FIG. 4 again, the drive unit 320 according to one embodiment of the invention may comprise a module for moving the main body 310 to other locations. For example, the drive unit 320 may include a module related to electrically, mechanically, or hydraulically driven wheels, propellers, or the like as the module for moving the main body 310 to other locations.

Next, the processor 330 according to one embodiment of the invention may be electrically connected to the drive unit 320 to perform a function of controlling the drive unit 320 (and may include a communication module for communicating with an external system). For example, the processor 330 may be a data processing device that are embedded in hardware and have circuits physically structured to perform codes included in a program or functions represented by instructions. For example, such a data processing device embedded in hardware may include a processing device such as a microprocessor, a central processing unit, a processor core, a multiprocessor, an application-specific integrated circuit (ASIC), and a field programmable gate array (FPGA).

Further, the processor 330 may perform the functions of at least one of the situation information management unit 210 and the task and travel management unit 220 of the robot control system 200 according to the invention (e.g., the corresponding functions may be modularized and included in the processor 330), and may function to control the drive unit 320 through communication with an external system (not shown) that performs the functions of at least one of the situation information management unit 210 and the task and travel management unit 220.

Specifically, the processor 330 may function to acquire, as first situation information on the patrolling robot 300, at least one of weight information on a support coupled to the patrolling robot 300 and image information on the support and information on a location of the patrolling robot 300 in a patrolling place, and to determine a task and a travel route of the patrolling robot 300 on the basis of the first situation information.

Meanwhile, although the embodiments in which the patrolling place according to the invention is a banquet room or a conference room are mainly described herein, it is noted that the patrolling place is not necessarily limited to the foregoing, and may be changed without limitation as long as the objects of the invention may be achieved. For example, the present invention may also be applied to a robot patrolling in a common restaurant.

Configuration of the Robot Control System

Hereinafter, the internal configuration of the robot control system 200 crucial for implementing the invention and the functions of the respective components thereof will be discussed.

Figure 2:
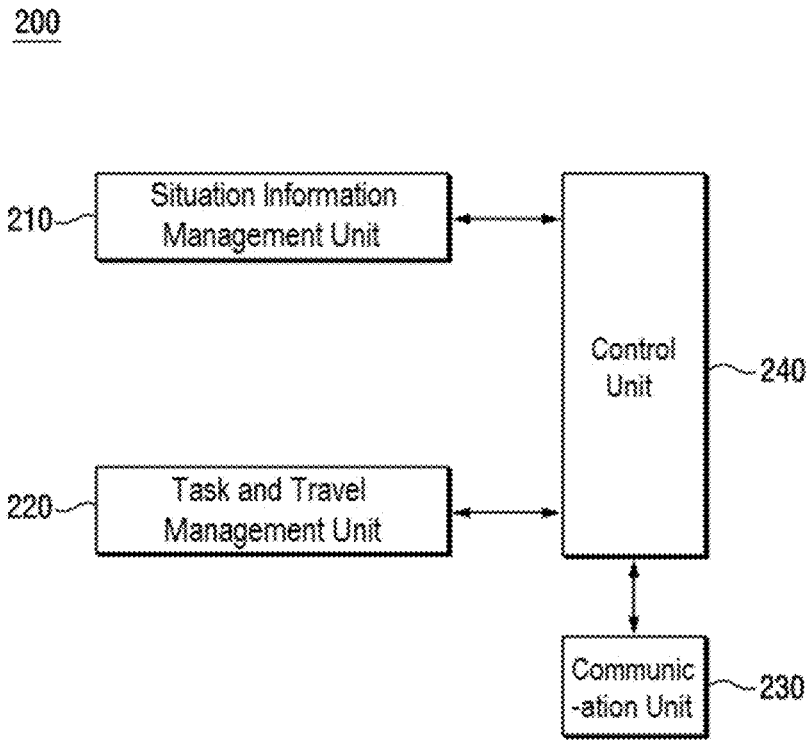
FIG. 2 specifically shows the internal configuration of a robot control system according to one embodiment of the invention.
Figure 3:
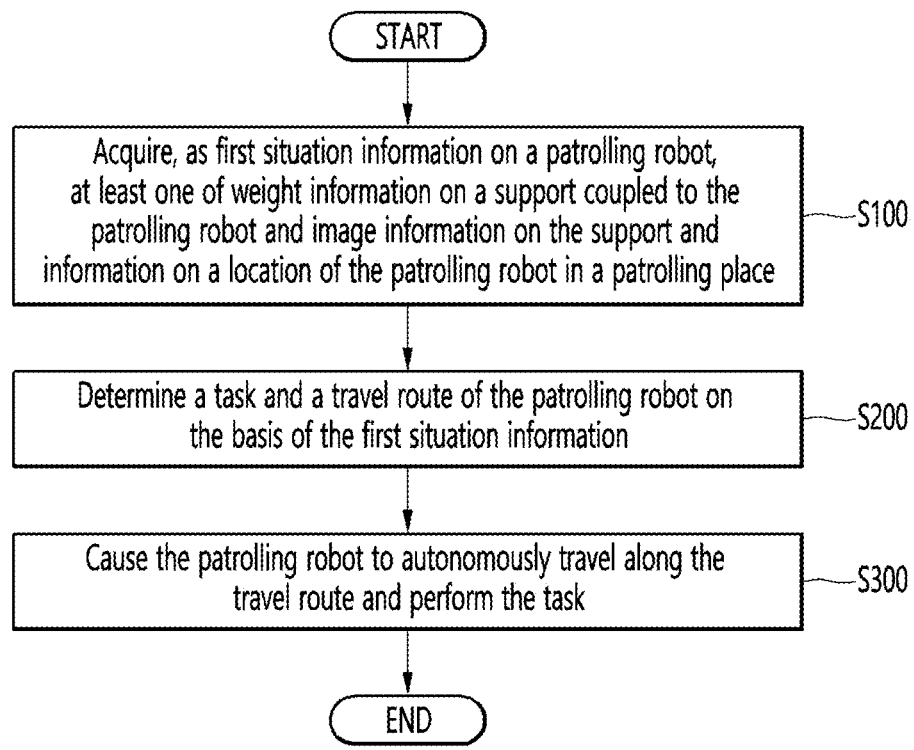
FIG. 3 is a flowchart illustrating how to control a patrolling robot according to one embodiment of the invention.

FIG. 2 specifically shows the internal configuration of the robot control system 200 according to one embodiment of the invention. Further, FIG. 3 is a flowchart illustrating how to control the patrolling robot 300 according to one embodiment of the invention.

As shown in FIG. 2, the robot control system 200 according to one embodiment of the invention may comprise a situation information management unit 210, a task and travel management unit 220, a communication unit 230, and a control unit 240. According to one embodiment of the invention, at least some of the situation information management unit 210, the task and travel management unit 220, the communication unit 230, and the control unit 240 may be program modules that communicate with an external system. The program modules may be included in the robot control system 200 in the form of operating systems, application program modules, and other program modules, while they may be physically stored in a variety of commonly known storage devices. Further, the program modules may also be stored in a remote storage device that may communicate with the robot control system 200. Meanwhile, such program modules may include, but are not limited to, routines, subroutines, programs, objects, components, and data structures for performing specific tasks or executing specific abstract data types according to the invention as will be described below.

Meanwhile, the above description is illustrative although the robot control system 200 has been described as above, and it will be apparent to those skilled in the art that at least a part of the components or functions of the robot control system 200 may be implemented or included in the patrolling robot 300 or an external system (not shown), as necessary. Further, in some cases, all of the functions and components of the robot control system 200 may be implemented or included in the patrolling robot 300.

First, in step S100, the situation information management unit 210 according to one embodiment of the invention may function to acquire, as first situation information on the patrolling robot 300, at least one of weight information on a support coupled to the patrolling robot 300 and image information on the support and information on a location of the patrolling robot 300 in a patrolling place.

Specifically, the situation information management unit 210 according to one embodiment of the invention may acquire, from a weight sensor included in the support, a weight sensed by the weight sensor or a change in the weight as the weight information on the support. According to one embodiment of the invention, the weight information may be acquired for each of at least one support coupled to the patrolling robot 300.

Further, the situation information management unit 210 according to one embodiment of the invention may acquire, from a photographing module configured to face a spatial region above the support, an image photographed by the photographing module or a change in the image as the image information on the support. According to one embodiment of the invention, the image information may be acquired for each of at least one support coupled to the patrolling robot 300.

In addition, the situation information management unit 210 according to one embodiment of the invention may acquire the information on the location of the patrolling robot 300 in the patrolling place. To this end, the patrolling robot 300 may have a location measurement module based on a beacon, RFID, or the like, but there is no limitation on how to measure the location. For example, the situation information management unit 210 according to one embodiment of the invention may acquire the information on the location of the patrolling robot 300 by analyzing images acquired by a camera installed in the patrolling place (e.g., a camera installed on the ceiling thereof), instead of or in addition to using the location measurement module provided in the patrolling robot 300.

Further, according to one embodiment of the invention, the information on the location of the patrolling robot 300 may include not only a location in a place where attendees receiving serving or bussing services are gathered, but also a location in a place where the patrolling robot 300 is supplied (or resupplied) with serving objects for serving (e.g., a kitchen) or a place where the patrolling robot 300 returns serving objects for bussing (e.g., a washing room). That is, according to one embodiment of the invention, the patrolling place should be understood as encompassing all places where the patrolling robot 300 may patrol around. According to one embodiment of the invention, the information on the location of the patrolling robot 300 may refer to, but is not limited to, information on coordinates of the patrolling robot 300 in a map for the patrolling place.

Meanwhile, the situation information management unit 210 according to one embodiment of the invention may function to recognize at least one serving object placed on or removed from the support on the basis of at least one of the weight information on the support and the image information on the support. Further, when the at least one serving object is recognized, the situation information management unit 210 according to one embodiment of the invention may acquire a result of the recognition as the first situation information on the patrolling robot 300.

Specifically, the situation information management unit 210 according to one embodiment of the invention may decide whether a serving object is placed on or removed from the support on the basis of at least one of the weight information on the support and the image information on the support. Further, the situation information management unit 210 according to one embodiment of the invention may specifically recognize what serving object is placed on or removed from the support on the basis of at least one of the weight information on the support and the image information on the support.

Here, according to one embodiment of the invention, it should be understood that placing or removing a serving object on or from the support encompasses not only directly placing or removing the serving object on or from the support, but also placing or removing the serving object on or from a structure disposed on the support. For example, referring to FIG. 4, a serving object may be considered to be placed on or removed from the support 340c when the serving object is placed on or removed from a structure 350 disposed on the support 340c. Likewise, referring to FIG. 5, drinks and food may be considered to be placed on or removed from the supports when the drinks and food are placed on or removed from the structures 440 and 450 disposed on the supports.

For example, the situation information management unit 210 according to one embodiment of the invention may decide whether a serving object is placed on or removed from the support on the basis of at least one of a change in a weight sensed by a weight sensor included in the support and a change in an image photographed by a photographing module configured to face a spatial region above the support.

As another example, the situation information management unit 210 according to one embodiment of the invention may specifically recognize a serving object placed on or removed from the support by processing the weight information on the support with reference to a database on weights of serving objects that may be provided in the patrolling place.

As yet another example, the situation information management unit 210 according to one embodiment of the invention may specifically recognize a serving object placed on or removed from the support by processing the image information on the support using a machine learning-based object recognition model for serving objects. Here, according to one embodiment of the invention, the object recognition model may be implemented using an algorithm such as R-CNN (Region-based Convolutional Neural Network), YOLO (You Only Look Once), and SSD (Single Shot Detector). However, the object recognition model is not necessarily limited to the foregoing and may be diversely changed as long as the objects of the invention may be achieved.

Further, the situation information management unit 210 according to one embodiment of the invention may acquire at least one of a number of attendees in each space of the patrolling place and a patrolling record at the patrolling place as second situation information on the patrolling place.

Specifically, the situation information management unit 210 according to one embodiment of the invention may specify at least a part of the patrolling place as a space distinguished from other spaces on the basis of states in which the attendees are gathered in the patrolling place, and may estimate the number of attendees contained in the specified space to acquire the number of attendees in the space as the second situation information on the patrolling place.

More specifically, the situation information management unit 210 according to one embodiment of the invention may estimate a degree to which the attendees are gathered in the vicinity of the robot and/or at least a partial space of the patrolling place, using at least one of an imaging module (e.g., a visible light camera or an infrared camera), a scanner module (e.g., a LIDAR sensor), and a sound acquisition module (e.g., a microphone) that may be included or installed in the patrolling robot 300 and/or the patrolling place, and may acquire the number of attendees in each space of the patrolling place on the basis of the degree.

Figure 6:
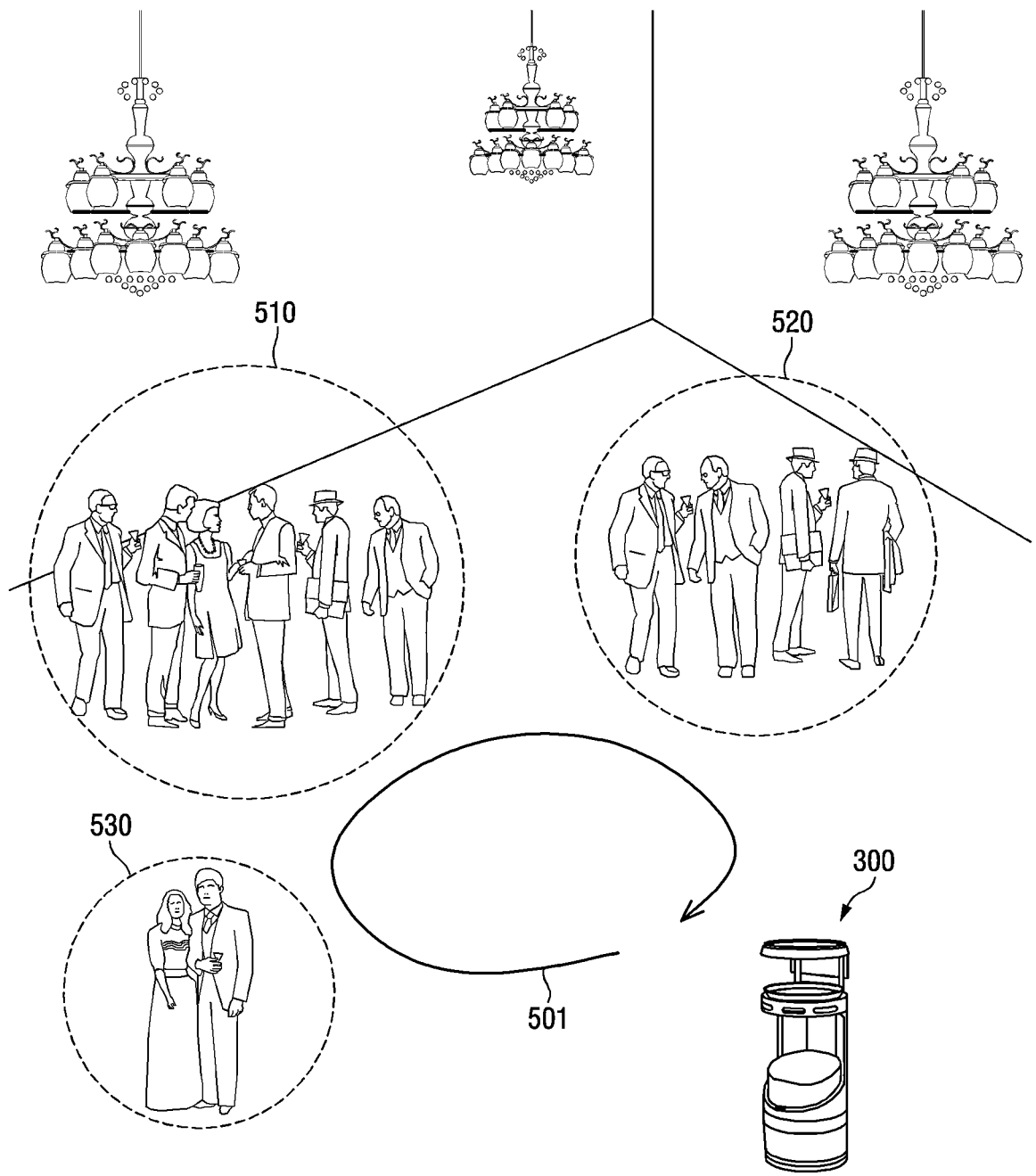
FIG. 6 illustratively shows how to determine a task and a travel route of a patrolling robot according to one embodiment of the invention.

For example, referring to FIG. 6, the situation information management unit 210 according to one embodiment of the invention may specify partial spaces of the patrolling place as a first space 510, a second space 520, and a third space 530 on the basis of states in which the attendees are gathered in the patrolling place, and may estimate the number of attendees contained in each of the spaces 510, 520, and 530 to acquire the numbers of attendees (i.e., 6, 4, and 2) in the respective spaces 510, 520, and 530 of the patrolling place.

Meanwhile, the manner of acquiring the numbers of attendees in the respective spaces of the patrolling place according to one embodiment of the invention is not limited to the foregoing, and it should be understood that the size or shape of the spaces specified to acquire the numbers of attendees may be diversely changed as long as the objects of the invention may be achieved. For example, when tables are arranged in the patrolling place, the situation information management unit 210 according to one embodiment of the invention may specify each of the tables (or its vicinity) as a fixed space, and when the patrolling place is formed such that the attendees can move freely as shown in FIG. 6, the spaces may be dynamically specified on the basis of states in which the attendees are gathered.

Further, the situation information management unit 210 according to one embodiment of the invention may acquire the patrolling record at the patrolling place as the second situation information on the patrolling place. The situation information management unit 210 according to one embodiment of the invention may acquire the patrolling record on the basis of the above-described first situation information on the patrolling robot 300, and the patrolling record may include a serving record for serving objects (e.g., a location of a space that the patrolling robot 300 has visited for serving, a visit time, an amount of time spent during the visit, an amount of served serving objects, a serving time, an amount of time having elapsed from the last visit, an amount of time having elapsed from the last serving, a location of a space where serving objects have run out, and the like) and a bussing record for serving objects (e.g., a location of a space that the patrolling robot 300 has visited for bussing, a visit time, an amount of time spent during the visit, an amount of bussed serving objects, a bussing time, an amount of time having elapsed from the last visit, an amount of time having elapsed from the last bussing, a location of a space full of serving objects to be retrieved, and the like). The situation information management unit 210 according to one embodiment of the invention may acquire the patrolling record for each space of the patrolling place, and may acquire the patrolling record for each serving object when the serving object is specifically recognized.

Furthermore, the situation information management unit 210 according to one embodiment of the invention may estimate demand for serving objects in each space of the patrolling place on the basis of the second situation information on the patrolling place acquired as above. According to one embodiment of the invention, the demand for serving objects in each space may include at least one of demand for serving of the serving objects in each space and demand for bussing of the serving objects in each space.

Specifically, the situation information management unit 210 according to one embodiment of the invention may estimate at least one of demand for serving and demand for bussing in a specific space, on the basis of at least one of a ratio of an amount of serving objects served or bussed in the specific space and a number of attendees in the space, an amount of time having elapsed from the last visit of the patrolling robot 300 for serving or bussing in the specific space, an amount of time spent during the last visit (the number of attendees in the space may be considered together), an amount of time having elapsed from the last serving or bussing of the patrolling robot 300 in the specific space, a location of a space where serving objects served by the patrolling robot 300 have run out, and a location of a space full of serving objects to be retrieved (i.e., bussed) by the patrolling robot 300.

For example, the situation information management unit 210 according to one embodiment of the invention may estimate demand for serving (or bussing) in a specific space to be higher as a value obtained by dividing an amount of serving objects served (or bussed) in the space by a number of attendees in the space is smaller; an amount of time having elapsed from the last visit of the patrolling robot 300 for serving or bussing in the space is greater; an amount of time spent by the patrolling robot 300 during the last visit is smaller (compared to the number of attendees in the space); or an amount of time having elapsed from the last serving (or bussing) of the patrolling robot 300 in the space is greater.

As another example, the situation information management unit 210 according to one embodiment of the invention may estimate demand for serving to be high in a space where serving objects served by the patrolling robot 300 have run out, and may estimate demand for bussing to be high in a space full of serving objects to be retrieved (i.e., bussed) by the patrolling robot 300.

However, the factors that may be considered in estimating demand for serving objects in each space according to one embodiment of the invention and the manner of estimating the demand for serving objects in each space are not limited to the foregoing, and may be diversely changed as long as the objects of the invention may be achieved.

Meanwhile, the situation information management unit 210 according to one embodiment of the invention may function to allow at least one of the first situation information on the patrolling robot 300, the second situation information on the patrolling place, and the demand for serving objects in each space to be shared among a plurality of patrolling robots 300 in the patrolling place.

Specifically, the situation information management unit 210 according to one embodiment of the invention may allow at least one of the first situation information, the second situation information, and the demand for serving objects in each space (which is estimated on the basis of the second situation information) to be shared among a plurality of patrolling robots 300 operated in the patrolling place, so that in determining at least one of a task, a travel route, and a travel speed of a specific patrolling robot 300 as will be described below, the first situation information, the second situation information, and/or the demand for serving objects in each space, which may be acquired from other patrolling robots 300, may be considered. That is, the situation information management unit 210 according to one embodiment of the invention may dynamically estimate the demand for serving objects in each space of the patrolling place, which is changeable according to the situation, using the plurality of patrolling robots 300, and may allow the demand for serving objects in each space to be shared among the plurality of patrolling robots 300.

Next, in step S200, the task and travel management unit 220 according to one embodiment of the invention may function to determine a task and a travel route of the patrolling robot 300 on the basis of the first situation information on the patrolling robot 300.

Specifically, the task and travel management unit 220 according to one embodiment of the invention may determine at least one of serving and bussing as the task of the patrolling robot 300 on the basis of the above-described first situation information on the patrolling robot 300. More specifically, the task and travel management unit 220 according to one embodiment of the invention may determine the task of the patrolling robot 300 on the basis of whether a serving object is placed on or removed from the support coupled to the patrolling robot 300 and/or a result of recognizing the serving object. Further, according to one embodiment of the invention, the task may be more specifically determined as, for example, departing from the kitchen for serving, continuing serving, returning to the kitchen for serving, switching from serving to bussing, continuing bussing, returning to the washing room for bussing, departing from the washing room for bussing, or switching from bussing to serving.

Further, the task and travel management unit 220 according to one embodiment of the invention may determine the travel route of the patrolling robot 300 on the basis of the above-described first situation information on the patrolling robot 300. In addition, the task and travel management unit 220 according to one embodiment of the invention may determine the task and travel route of the patrolling robot 300 with reference to the demand for serving objects in each space of the patrolling place, which is estimated on the basis of the second situation information on the patrolling place.

Specifically, the task and travel management unit 220 according to one embodiment of the invention may determine the travel route of the patrolling robot 300 such that the patrolling robot 300 preferentially visits a space in which the demand for serving objects is higher. In addition, the task and travel management unit 220 according to one embodiment of the invention may determine the task of the patrolling robot 300 such that the number of serving patrolling robots 300 and the number of bussing patrolling robots 300 are maintained at a predetermined ratio. Here, according to one embodiment of the invention, this ratio may be dynamically determined according to the patrolling situation.

For example, the task and travel management unit 220 according to one embodiment of the invention may maintain the number of serving patrolling robots 300 to be greater than the number of bussing patrolling robots 300 in a situation in which the demand for serving is high or increases (e.g., in the early stage of patrolling or when the number of attendees increases in the patrolling place), and may maintain the number of serving patrolling robots 300 to be less than the number of bussing patrolling robots 300 in the converse situation.

Meanwhile, the task and travel management unit 220 according to one embodiment of the invention may determine a travel speed of the patrolling robot 300 on the basis of at least one of the first situation information on the patrolling robot 300, the second situation information on the patrolling place, and the demand for serving objects in each space.

For example, the situation information management unit 210 according to one embodiment of the invention may acquire information on whether a serving object is placed on or removed from the support coupled to the patrolling robot 300 as the first situation information on the patrolling robot 300. Further, when the serving object is placed or removed as above while the patrolling robot 300 is traveling, the task and travel management unit 220 according to one embodiment of the invention may determine the travel speed of the patrolling robot 300 to be reduced. Further, when a situation in which the serving object is not placed on or removed from the support continues for or longer than a predetermined time, the task and travel management unit 220 according to one embodiment of the invention may determine the travel speed of the patrolling robot 300 to be increased.

As another example, the situation information management unit 210 according to one embodiment of the invention may acquire the number of attendees in each space of the patrolling place as the second situation information on the patrolling place, and may estimate the demand for serving objects in each space of the patrolling place on the basis of the second situation information. Further, the task and travel management unit 220 according to one embodiment of the invention may determine the travel speed of the patrolling robot 300 to be reduced in a specific space as the number of attendees in the space is greater or the demand for serving objects in the space is higher. Conversely, the task and travel management unit 220 according to one embodiment of the invention may determine the travel speed of the patrolling robot 300 to be increased in a specific space as the number of attendees in the space is smaller or the demand for serving objects in the space is lower.

Next, in step S300, the drive unit 320 according to one embodiment of the invention may function to cause the patrolling robot 300 to autonomously travel along the travel route and perform the task.

Figure 7:
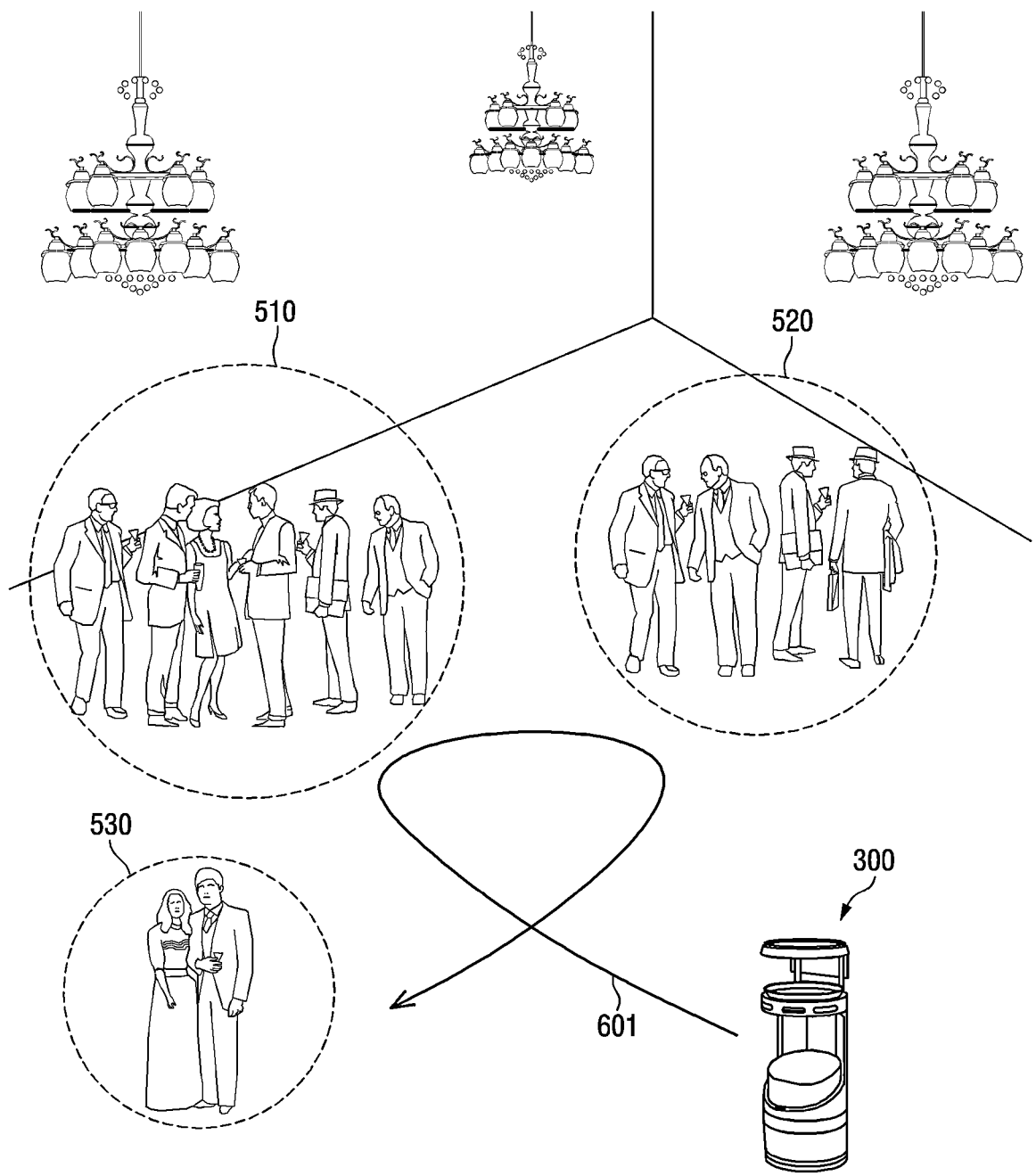
FIG. 7 illustratively shows how to determine a task and a travel route of a patrolling robot according to one embodiment of the invention.

FIGS. 6 and 7 illustratively show how to determine a task and a travel route of a patrolling robot according to one embodiment of the invention.

For example, referring to FIG. 6, the situation information management unit 210 according to one embodiment of the invention may acquire, as first situation information on the patrolling robot 300, at least one of weight information on a support coupled to the patrolling robot 300 and image information on the support and information on a location of the patrolling robot 300. Further, the task and travel management unit 220 according to one embodiment of the invention may determine a task of the patrolling robot 300 as serving until serving objects placed on the support run out, or as bussing until the support is full of serving objects to be retrieved. In addition, the task and travel management unit 220 according to one embodiment of the invention may determine a travel route of the patrolling robot 300 such that the patrolling robot 300 travels along a predetermined travel route 501, or may dynamically determine an appropriate travel route 501 on the basis of states in which attendees are gathered in the respective spaces 510, 520, and 530 of the patrolling space.

As another example, referring to FIG. 7, the situation information management unit 210 according to one embodiment of the invention may acquire, as second situation information on a patrolling place, at least one of numbers of attendees in the respective spaces 510, 520, and 530 of the patrolling place and a patrolling record at the patrolling place. Further, the task and travel management unit 220 according to one embodiment of the invention may determine a travel route 601 of the patrolling robot 300 such that the patrolling robot 300 preferentially visits a space in which demand for serving objects is higher, with reference to demand for serving objects in the respective spaces 510, 520, and 530 of the patrolling place estimated on the basis of the second situation information.

Next, the communication unit 230 according to one embodiment of the invention may function to enable data transmission/reception from/to the situation information management unit 210 and the task and travel management unit 220.

Lastly, the control unit 240 according to one embodiment of the invention may function to control data flow among the situation information management unit 210, the task and travel management unit 220, and the communication unit 230. That is, the control unit 240 according to one embodiment of the invention may control data flow into/out of the robot control system 200 or data flow among the respective components of the robot control system 200, such that the situation information management unit 210, the task and travel management unit 220, and the communication unit 230 may carry out their particular functions, respectively.

The embodiments according to the invention as described above may be implemented in the form of program instructions that can be executed by various computer components, and may be stored on a computer-readable recording medium. The computer-readable recording medium may include program instructions, data files, and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be changed to one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method for controlling a patrolling robot, the method comprising the steps of:
    acquiring, as first situation information on the patrolling robot, at least one of weight information on a support coupled to the patrolling robot and image information on the support and information on a location of the patrolling robot in a patrolling place;
    determining a task and a travel route of the patrolling robot on the basis of the first situation information; and
    causing the patrolling robot to autonomously travel along the travel route and perform the task,
    wherein in the acquiring step, a number of attendees in each of spaces of the patrolling place and a patrolling record at the patrolling place are acquired as second situation information on the patrolling place, and demand for serving objects in each of the spaces of the patrolling place is estimated on the basis of the second situation information,
    wherein in the determining step, the task and travel route of the patrolling robot are determined with reference to the demand for serving objects in each of the spaces, and
    wherein the demand for serving objects in a specific space of the patrolling place is estimated on the basis of a ratio of an amount of serving objects that have been served or bussed in the specific space and a number of attendees in the specific space.

2. The method of claim 1, wherein in the acquiring step, at least one serving object placed on or removed from the support is recognized on the basis of at least one of the weight information on the support and the image information on the support, and a result of the recognition is further acquired as the first situation information.

3. The method of claim 1, wherein the demand for serving objects in each of the spaces includes at least one of demand for serving of the serving objects in each of the spaces and demand for bussing of the serving objects in each of the spaces.

4. The method of claim 1, wherein at least one of the first situation information, the second situation information, and the demand for serving objects in each of the spaces is shared among a plurality of patrolling robots in the patrolling place.

5. The method of claim 1, wherein in the determining step, the travel route of the patrolling robot is determined such that the patrolling robot preferentially visits a space of the patrolling place in which the demand for serving objects is higher.

6. The method of claim 1, wherein in the determining step, a travel speed of the patrolling robot is further determined on the basis of at least one of the first situation information, the second situation information, and the demand for serving objects in each of the spaces.

7. A non-transitory computer-readable recording medium having stored thereon a computer program for executing the method of claim 1.

8. A system for controlling a patrolling robot, the system comprising:
    a situation information management unit configured to acquire, as first situation information on the patrolling robot, at least one of weight information on a support coupled to the patrolling robot and image information on the support and information on a location of the patrolling robot in a patrolling place;
    a task and travel management unit configured to determine a task and a travel route of the patrolling robot on the basis of the first situation information; and
    a drive unit configured to cause the patrolling robot to autonomously travel along the travel route and perform the task, wherein the situation information management unit is configured to acquire a number of attendees in each of spaces of the patrolling place and a patrolling record at the patrolling place as second situation information on the patrolling place, and to estimate demand for serving objects in each of the spaces of the patrolling place on the basis of the second situation information, wherein the task and travel management unit is configured to determine the task and travel route of the patrolling robot with reference to the demand for serving objects in each of the spaces, and wherein the demand for serving objects in a specific space of the patrolling place is estimated on the basis of a ratio of an amount of serving objects that have been served or bussed in the specific space and a number of attendees in the specific space.

9. The system of claim 8, wherein the situation information management unit is configured to recognize at least one serving object placed on or removed from the support on the basis of at least one of the weight information on the support and the image information on the support, and to further acquire a result of the recognition as the first situation information.

10. The system of claim 8, wherein the demand for serving objects in each of the spaces includes at least one of demand for serving of the serving objects in each of the spaces and demand for bussing of the serving objects in each of the spaces.

11. The system of claim 8, wherein the situation information management unit is configured to share at least one of the first situation information, the second situation information, and the demand for serving objects in each of the spaces among a plurality of patrolling robots in the patrolling place.

12. The system of claim 8, wherein the task and travel management unit is configured to determine the travel route of the patrolling robot such that the patrolling robot preferentially visits a space of the patrolling place in which the demand for serving objects is higher.

13. The system of claim 8, wherein the task and travel management unit is configured to further determine a travel speed of the patrolling robot on the basis of at least one of the first situation information, the second situation information, and the demand for serving objects in each of the spaces.

\* \* \* \* \*